(12) United States Patent
Poon et al.

(10) Patent No.: US 9,843,361 B2
(45) Date of Patent: Dec. 12, 2017

(54) COMMUNICATING VIA NEAR FIELD COMMUNICATIONS

(71) Applicant: GOOGLE INC., Mountain View, CA (US)

(72) Inventors: Tommy Poon, Frisco, TX (US); Mun-Wei Low, Irving, TX (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/875,684

(22) Filed: Oct. 5, 2015

(65) Prior Publication Data

US 2016/0099759 A1     Apr. 7, 2016

Related U.S. Application Data

(60) Provisional application No. 62/060,220, filed on Oct. 6, 2014, provisional application No. 62/081,328, filed on Nov. 18, 2014.

(51) Int. Cl.
*H04B 5/00* (2006.01)

(52) U.S. Cl.
CPC ......... *H04B 5/0056* (2013.01); *H04B 5/0031* (2013.01)

(58) Field of Classification Search
CPC ............................ H04B 5/0056; H04B 5/0031
USPC ....................................................... 455/41.1
See application file for complete search history.

(56) References Cited

U.S. PATENT DOCUMENTS

| | | | | |
|---|---|---|---|---|
| 8,297,520 B1* | 10/2012 | Wakerly | ............... | G06Q 20/352 |
| | | | | 235/487 |
| 8,527,987 B2* | 9/2013 | Johansson | ................. | G06F 8/61 |
| | | | | 455/41.1 |
| 8,604,913 B2* | 12/2013 | Ryoo | .................. | G06K 7/0008 |
| | | | | 340/10.1 |
| 2005/0188360 A1* | 8/2005 | de Jong | ............... | G06Q 20/341 |
| | | | | 717/136 |
| 2009/0075592 A1* | 3/2009 | Nystrom | ............ | G06K 19/0719 |
| | | | | 455/41.1 |
| 2010/0302078 A1* | 12/2010 | Schuessler | ........... | G06K 7/0008 |
| | | | | 341/90 |
| 2010/0325052 A1* | 12/2010 | Sahota | ................... | G06Q 20/10 |
| | | | | 705/67 |

(Continued)

*Primary Examiner* — Edward Urban
*Assistant Examiner* — Ralph H Justus
(74) *Attorney, Agent, or Firm* — Johnson, Marcou & Issacs, LLC

(57) ABSTRACT

Communicating via near field communication (NFC) between a reader and an application on an NFC-enabled device. The device receives, from a reader, a selection of an application identifier (AID) proxy of the device. The proxy receives, from the reader, a query (including domain name) directed to the availability of an application on the device. The proxy determines whether the domain name corresponds to an AID of an application on the device by reference to a data store relating each domain name of each application to a corresponding AID. When the domain determined to correspond to an AID of an application on the device, the device transmits a response to the reader indicating the AID corresponding to the domain name. The device receives, from the reader, selection of the transmitted AID. The application corresponding to selected AID communicates with the reader in an NFC application protocol data unit communication session.

20 Claims, 10 Drawing Sheets

(56) References Cited

U.S. PATENT DOCUMENTS

| | | | | |
|---|---|---|---|---|
| 2011/0087610 A1* | 4/2011 | Batada | .................... | G06F 21/72 |
| | | | | 705/318 |
| 2011/0256891 A1* | 10/2011 | Soliman | ................ | H04W 68/12 |
| | | | | 455/458 |
| 2012/0028579 A1* | 2/2012 | Fine | .................. | H04L 29/12254 |
| | | | | 455/41.1 |
| 2014/0279309 A1* | 9/2014 | Cowen | ................... | G06Q 40/12 |
| | | | | 705/30 |
| 2014/0317686 A1* | 10/2014 | Vetillard | ................ | G06F 21/74 |
| | | | | 726/2 |
| 2015/0127529 A1* | 5/2015 | Makhotin | .............. | G06Q 20/08 |
| | | | | 705/39 |
| 2015/0280787 A1* | 10/2015 | Lerch | ................... | H04B 5/0031 |
| | | | | 455/41.1 |
| 2016/0088424 A1* | 3/2016 | Polo | ..................... | H04W 4/008 |
| | | | | 455/41.1 |

\* cited by examiner

COMMUNICATING VIA NEAR FIELD COMMUNICATIONS

RELATED APPLICATIONS

This application claims priority to U.S. Provisional Patent Application No. 62/081,328, filed Nov. 18, 2014 and entitled "Systems, Methods, And Computer Program Products For Identifying Applications"; and to U.S. Provisional Patent Application No. 62/060,220, filed Oct. 6, 2014 and entitled "Systems, Methods And Computer Program Products For Routing Application Communications." The complete disclosure of each above-identified priority application is hereby fully incorporated herein by reference.

TECHNICAL FIELD

The technology disclosed herein relates to near field communication (NFC). Example embodiments relate to communicating via NFC between an NFC reader and an NFC-enabled application available on a NFC-enabled user computing device.

BACKGROUND

NFC is a short-range radio frequency (RF) communication technology, typically operating at a distance of 10 cm or less between two communicating devices. Communication via NFC involves an initiator device (often referred to as a "reader") and a target device.

In a simple NFC communication configuration, the reader can generate an RF field that can power a target that does not require batteries. This configuration enables use of an NFC target having a simple form such as a tag, a sticker, a key fob, or a smart card. Simple NFC targets are typically read-only and directed to a single application, for example, a single-purpose contactless smart card used for payment in connection with a credit card account. In addition to payment, NFC targets have applications in areas such as ticketing, access, RF identification (RFID) tags, loyalty programs, and coupons.

In a more sophisticated NFC communication configuration, the NFC target can be emulated by using a secure element (SE) installed in a "host" device, such as a mobile phone. An SE is a tamper-resistant hardware platform, capable of securely running SE applications and storing confidential and cryptographic data. An SE can be included in the subscriber identity module (SIM) or universal integrated circuit card (UICC) of a mobile device (the host) as an embedded SE (eSE). An SE can also be installed in a secure digital (SD) card that can be inserted in to a mobile device. An NFC controller in the mobile device handles communication between the SE and an NFC reader. Such an arrangement allows the SE to emulate a smart card.

Host-based card emulation (HCE), more often simply "Host Card Emulation," is a technology that allows an NFC-enabled host device, such as a mobile phone, to appear as an NFC target to an NFC reader, without relying on a conventional passive NFC target or an SE. In a typical HCE implementation, the NFC controller, also referred to as a contactless front end (CLF), can interface with an application running under the operating system (OS) of the host. For example, a mobile phone can run a mobile wallet payment application under the phone's OS. The mobile wallet payment application can communicate with an NFC-enabled point of sale (POS) device via the CLF.

Before the introduction of HCE, requests coming from a contactless reader to communicate with an NFC application in a mobile device were routed to the active SE. HCE implementations must take into account the possible coexistence of NFC card emulation services on an SE and in the host OS. This coexistence requires the CLF to be able to identify the appropriate NFC-enabled application by identifying the environment (for example, SE in a UICC, HCE, eSE) under which the application is available.

One way to accomplish such routing is by using an NFC application identifier (AID). The CLF on the device maintains a routing table that lists AIDs for the applications on the device. When the CLF receives a request to select an application ("SELECT AID" command) from a reader, the CLF searches for the AID in its routing table. If it finds the AID in the CLF routing table, the CLF will route the command to the correct SE or the host OS. A typical application identifier (AID) includes up to sixteen 8-bit bytes.

SUMMARY

Embodiments of the technology disclosed herein provide systems, methods, and computer program products to communicate NFC between an NFC reader and an NFC-enabled application available on a NFC-enabled user computing device. In such embodiments, an NFC-enabled user computing device receives, from an NFC reader by via an NFC channel, a first selection of an NFC AID proxy of the user computing device. The selected proxy receives, from the reader via the channel, a query directed to the availability of an NFC-enabled application on the user computing device. The query includes an argument identifying the application by a domain name different than an AID of the application. The proxy can determine whether the received domain name corresponds to an AID of an application available on the user computing device by reference to a data store relating each domain name of each application available on the user computing device to a corresponding AID. When the received domain determined to correspond to an AID of an application available on the user computing device, the user computing device can transmit, to the reader via the channel, a response to the received query. The response indicates the AID of the application corresponding to the received domain name. The user computing device receives, from the reader via the channel, a selection of the transmitted AID. The application corresponding to selected AID communicates with the reader, via the channel, in an NFC application protocol data unit (APDU) communication session.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

As the use of AID-based applications in both SE and HCE environments grows, support of numerous use combinations within a confined resource and the introduction of multiple SEs (and an HCE) within the NFC target (for example, a mobile device) is becoming increasingly challenging. Each AID in a CLF routing table uses memory for storage, which may be up to twenty (20) bytes when overhead is considered. Because of the size of AIDs (e.g. sixteen (16) bytes and/or variable length values), and the fact that not all NFC application have a user interface, the AID-to-route mapping mechanism does not support all the possible usage combination, especially when more than two environments (from among eSE, HCE, and UICC) are all in place in the target device. Further, the need for the reader to store specific AIDs creates a deployment challenge when new applications, or new versions of applications carrying a different AID, or new/revised policies for choosing from among multiple NFC-enabled applications on the target are introduced.

Embodiments of the technology disclosed herein include methods, systems, and computer program products for an NFC AID proxy that represent improvements in target device operation over a basic NFC CLF AID routing table. In some such embodiments, an NFC AID proxy maps a domain name AID or AID category from the reader, and returns an actual AID to support a communication session between the reader and the target.

Example System Architectures

In example architectures for the technology, while some devices shown in the architecture are represented by one instance of the device, in some cases multiple instances of each device can be used. Further, while certain aspects of operation of the present technology are presented in examples related to the figures to facilitate enablement of the claimed invention, additional features of the present technology, also facilitating enablement of the claimed invention, are disclosed elsewhere herein.

Figure 1:
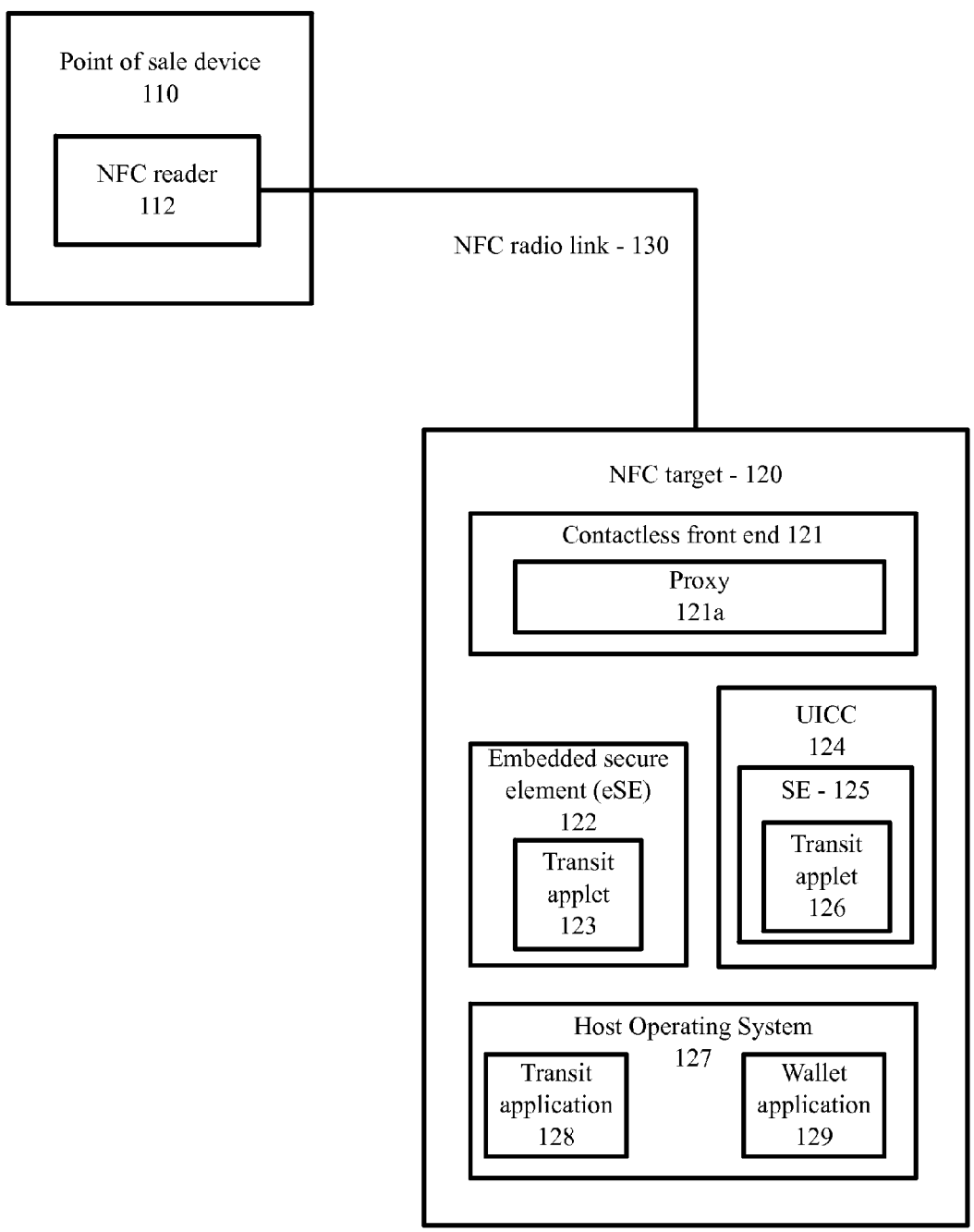
FIG. 1 is a block diagram depicting a communications and processing architecture in accordance with certain example embodiments.

As depicted in FIG. 1, architecture 100 includes point of sale (POS) computing device 110 and NFC target computing device 120. The POS device 110 and the NFC target 120 can be in communication over an NFC radio link 130 when the NFC target 120 is in close proximity (typically <10 cm) to the POS device 110.

The POS device 110 includes an NFC reader 112 operable to generate an RF field that supports an NFC radio link 130 with an NFC target 120. The NFC reader 112 is then operable to communicate with the NFC target 120 to execute operations such as a payment transaction, control of access, and verification of identity. While the example architecture 100 includes an NFC reader 112 as part of a POS device 110, other architectures employing the present technology include an NFC reader 112 outside of a POS device 110.

The NFC target 120 can include a contactless front end (CLF) 121, an embedded SE 122, a UICC 124 containing a second SE 125, and a host operating system 126 supporting an HCE environment (not explicitly shown). The CLF 121 interacts with the lower levels of the NFC protocol (for example, the physical layer) of the communication over the NFC radio link 130, allowing the NFC target 120 to communicate with the NFC reader 112. The CLF 121 includes procedures that can establish, configure, and maintain the NFC target, and that can react to messages from the NFC Reader 112, the eSE 122, the SE 125 within the UICC 124, and from one or more HCE applications in the host operating system 127. As described above, the contactless front end 121 can use an AID-based routing table to route NFC messages, each message called an Application Program Data Unit (APDU), between the POS device 110 and an NFC application, for example, transit application 123 running on the eSE 122. In some embodiments, a user associated with one or both of the POS device 110 and the NFC target 120 a must install an application and/or make a feature selection to obtain the benefits of the technology described herein. The CLF includes an AID proxy 121a operable to map NFC domain names to AIDs. Transit applets 123 and 126 run respectively on eSE 122 and UICC-embedded SE 125. Both a transit application 128 and a wallet application 129 run in the HCE environment under the host operating system 127.

Throughout the discussion of example embodiments, it should be understood that the terms "data" and "information" are used interchangeably herein to refer to text, images, audio, video, or any other form of information that can exist in a computer-based environment. Additionally, those having ordinary skill in the art and having the benefit of this disclosure will appreciate that the elements illustrated in FIG. 1 may have any of several other suitable computer system configurations. For example, the NFC target 120 can be embodied as a mobile phone or handheld computer. In some embodiments, a merchant can operate the POS device 110, and the NFC target 120 can be a smartphone operated by a customer.

Figure 10:
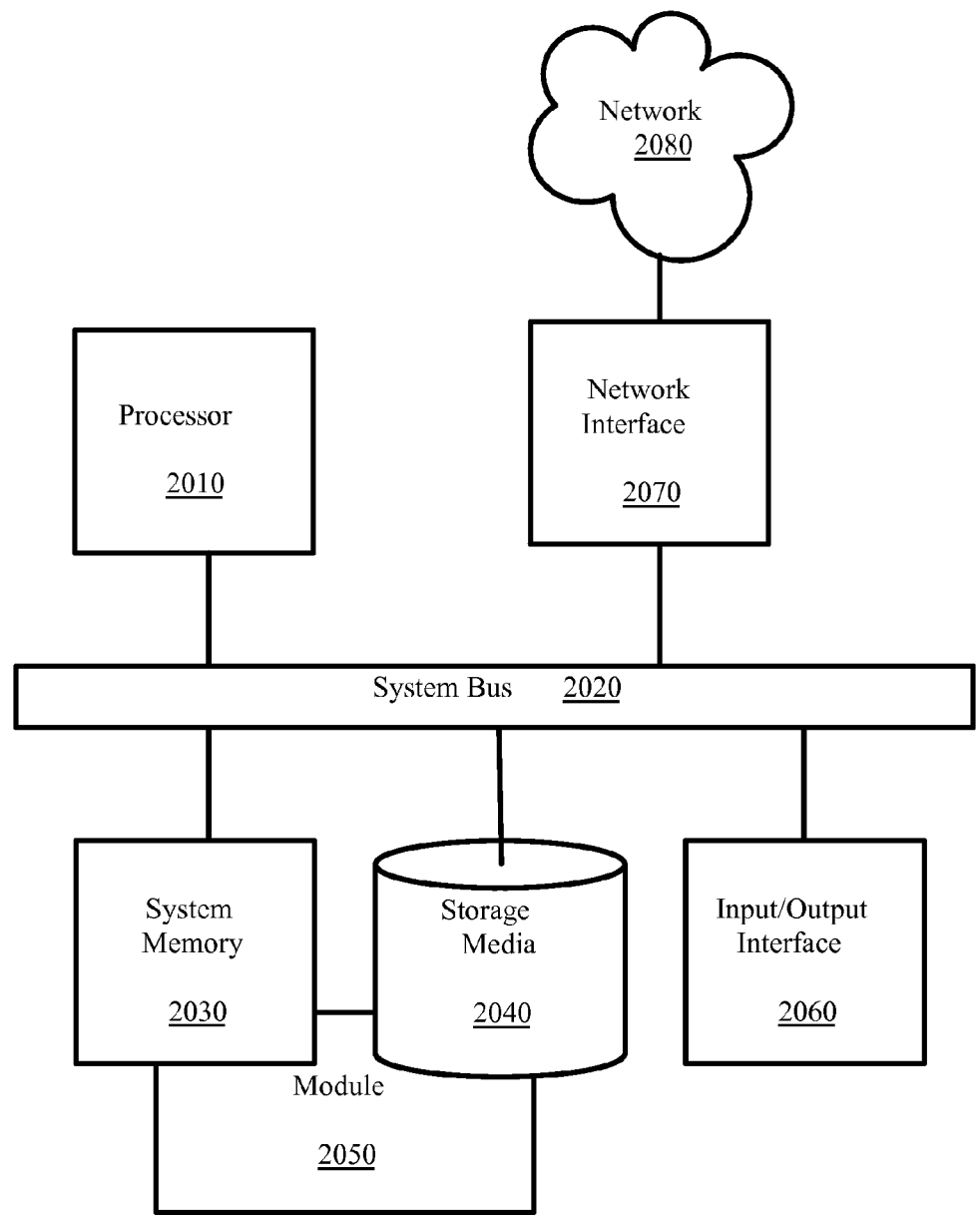
FIG. 10 is a block diagram depicting a computing machine and a module, in accordance with certain example embodiments.

In example embodiments, the devices associated with the technology presented herein may be any type of computing machine such as, but not limited to, those discussed in more detail with respect to FIG. 10. Furthermore, any functions, applications, or modules associated with any of these computing machines, such as those described herein or any others (for example, scripts, web content, software, firmware, or hardware) associated with the technology presented herein may by any of the modules discussed in more detail with respect to FIG. 5. The computing machines discussed herein may communicate with one another, as well as with other computing machines or communication systems over one or more networks, such as network 105. The network 105 may include any type of data or communications network, including any of the network technology discussed with respect to FIG. 10. The computing machines discussed herein may communicate with one another as well as other computing machines or communication systems over one or more other networks in addition to the NFC radio link 130 (for example, over the Internet for provisioning).

Example Embodiments

The example embodiments illustrated in the following figures are described hereinafter with respect to the components of the example operating environment and example architecture described elsewhere herein. The example embodiments may also be practiced with other systems and in other environments.

Consider the following scenario as a continuing example in the transit category of NFC applications. San Francisco (SF) City Bus (hereinafter "Bus") offers an NFC-enabled fare solution available as an applet executable in an SE in a UICC for a smartphone, and as a smartphone application executing in an HCE environment. SF City Cable Car (hereinafter "Cable Car") offers an NFC-enabled fare solution available as an applet executing in an SE in a UICC for a smartphone. Bay Area Rapid Transit (hereinafter "BART") offers an NFC-enabled fare solution available as an applet executable in an SE in a UICC for a smartphone, and as a smartphone application executing in an HCE environment. Both the Bus solution and the Cable Car solution accept any Bay Area Public Transit (hereinafter "Public") payment if the transit agency's own payment option is not present. Both Bus and BART prioritize the UICC solution. The user in the continuing example patronizes both BART and Bus on his commute. In the transit category of NFC applications, only one applet/application (hereinafter collectively "application(s)") may be active at a time, and repeated switching between applications is undesirable. Using the technology disclosed in the present application, both BART and Bus can avoid requiring the user to switch active applications, and can revise or upgrade applications without modifying the reader.

In the continuing example, an AID Proxy 121a running as part of the CLF 121 has an AID of A012345678A. In other example embodiments, the AID proxy can run in other portions of the host 120. An optional patterned AID format with routing information embedded (explained in more detail below) uses a "CEDX" bit pattern embedded in the AID to indicate routing, wherein X=0 indicates routing to HCE running under the host OS 126, X=1 indicates routing to the eSE 122, and X=2 indicates routing to the UICC 124.

The continuing example uses domain naming between the reader and the AID proxy for each of Bus, Cable Car, and BART applications. The Bus domain is indicated by AID=A0111111110001, corresponding to actual deployed AIDs A01111111100010ED2 and A01111111100010ED0. The Cable Car domain is indicated by AID=A0222222220022, corresponding to actual deployed AID A0222222220022CED2. The BART domain is indicated by AID=A0333333330333, corresponding to actual deployed AIDs A033333333CED2 and A033333333CED0. The Public domain is indicated by AABBCCDD02.

Figure 2:
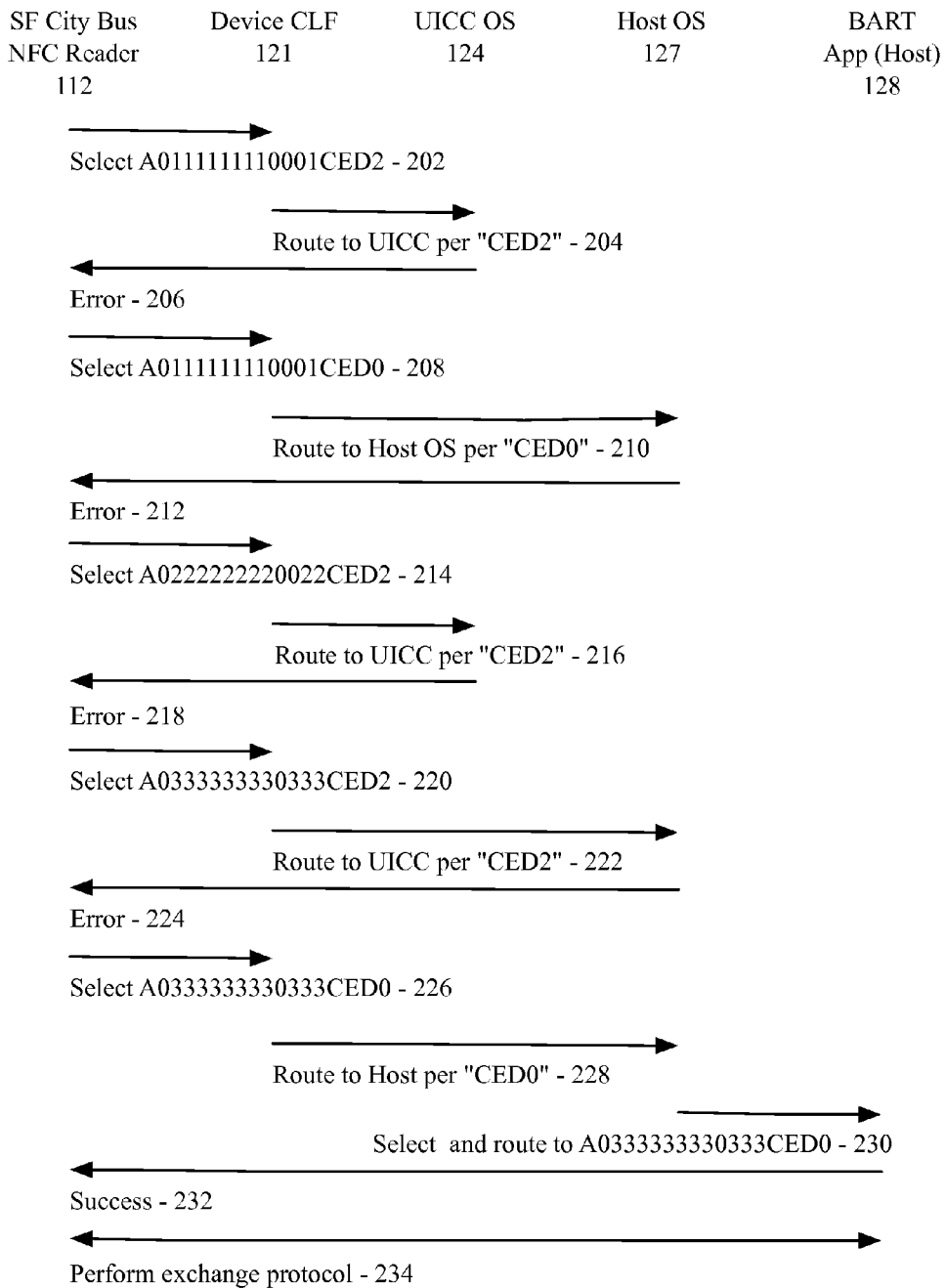
FIG. 2 is message flow diagram depicting interaction between a host and a reader, without employing an AID proxy.

Referring to FIG. 2, a message flow 200 illustrates an interaction between a host 120 and a reader 112, without employing an AID Proxy. In this interaction, the user presents an NFC-enabled smartphone 120 to a Bus reader 112. The user's NFC-enabled smartphone 120 has only the BART HCE application (AID A0333333330333CED0) enabled.

Upon sensing the smartphone 120, the Bus reader 112 selects its preferred application—UICC applet A01111111100010ED2—Message 202. The CLF 121 in the smartphone 120 routes the selection to the UICC 124 because the "CED2" embedded in the AID corresponds to the UICC 124—Message 204. The UICC 124 responds to the reader 112, through CLF 121, with an error message (Message 206) because the smartphone 120, which supports the BART HCE application, does not support the Bus UICC applet.

The Bus reader 112 selects its next preferred application—the Bus HCE application A01111111100010ED0—Message 208. The CLF 121 routes the selection to the host OS 127 because "CED0" corresponds to the host OS 127—Message 210. The host OS 127 responds to the reader 112, through CLF 121, with an error message (Message 212) because the smartphone 120, which supports the BART HCE application, does not support the Bus HCE application.

The Bus reader 112 selects its next preferred solution—the Cable Car UICC applet A0222222220022CED2—Message 214. The CLF 121 routes the selection to the UICC 124 because the "CED2" embedded in the AID corresponds to the UICC 124—Message 216. The UICC 124 responds to the reader 112, through CLF 121, with an error message (Message 218) because the smartphone 120, which supports the BART HCE application, does not support the Cable Car UICC HCE applet.

The Bus reader 112 selects its next preferred solution—the BART UICC applet A0333333330333CED2—Message 220. The CLF 121 routes the selection to the UICC 124 because the "CED2" embedded in the AID corresponds to the UICC 124—Message 222. The UICC 124 responds to the reader 112, through CLF 121, with an error message (Message 224) because the smartphone 120, which supports the BART HCE application, does not support the BART UICC applet.

The Bus reader 112 selects its next preferred solution—the BART HCE application A0333333330333CED0—Message 226. The CLF 121 routes the selection to the host OS 127 because the "CED0" embedded in the AID corresponds to the host OS 127—Message 228. The host OS 127 routes the selection to the BART transit application 128 running under the host OS 127 because "A0333333330333CED0" corresponds to the AID of the BART transit application 128. The approach illustrated in the message flow 200 of FIG. 2, while eventually successful, can be ineffective.

Figure 3:
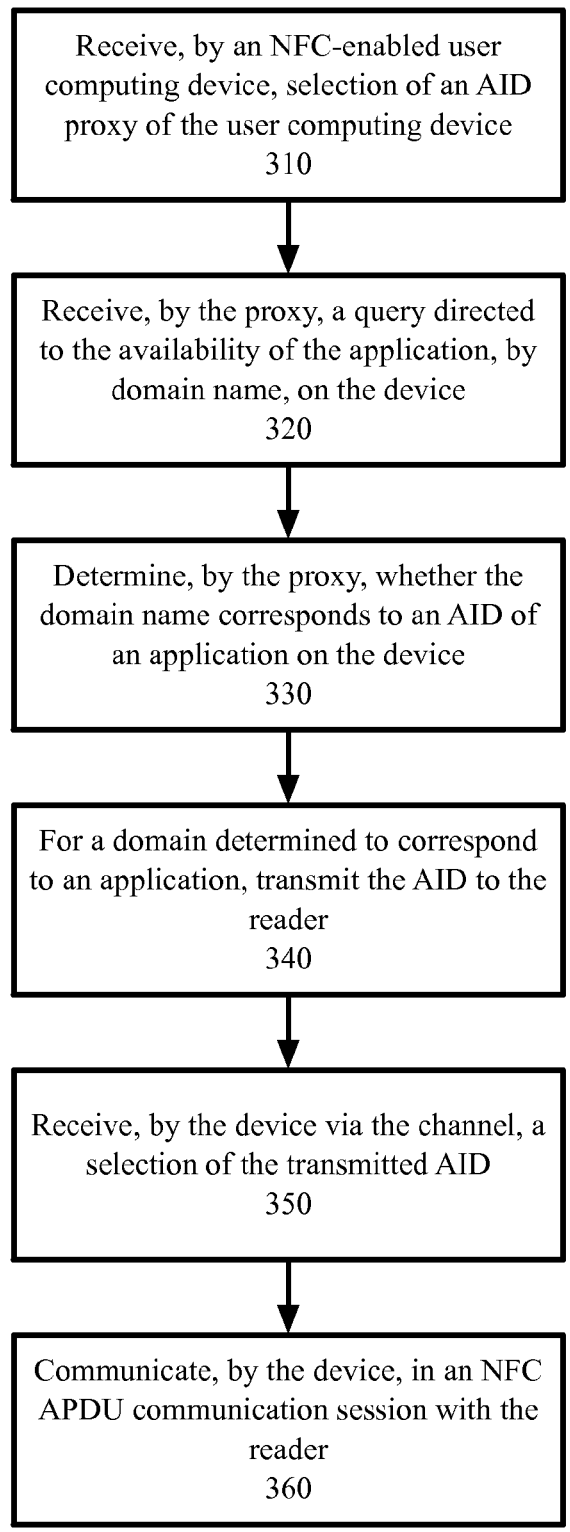
FIG. 3 is a block flow diagram depicting an interaction between a reader and a host employing an AID proxy, in accordance with example embodiments.
Figure 4:
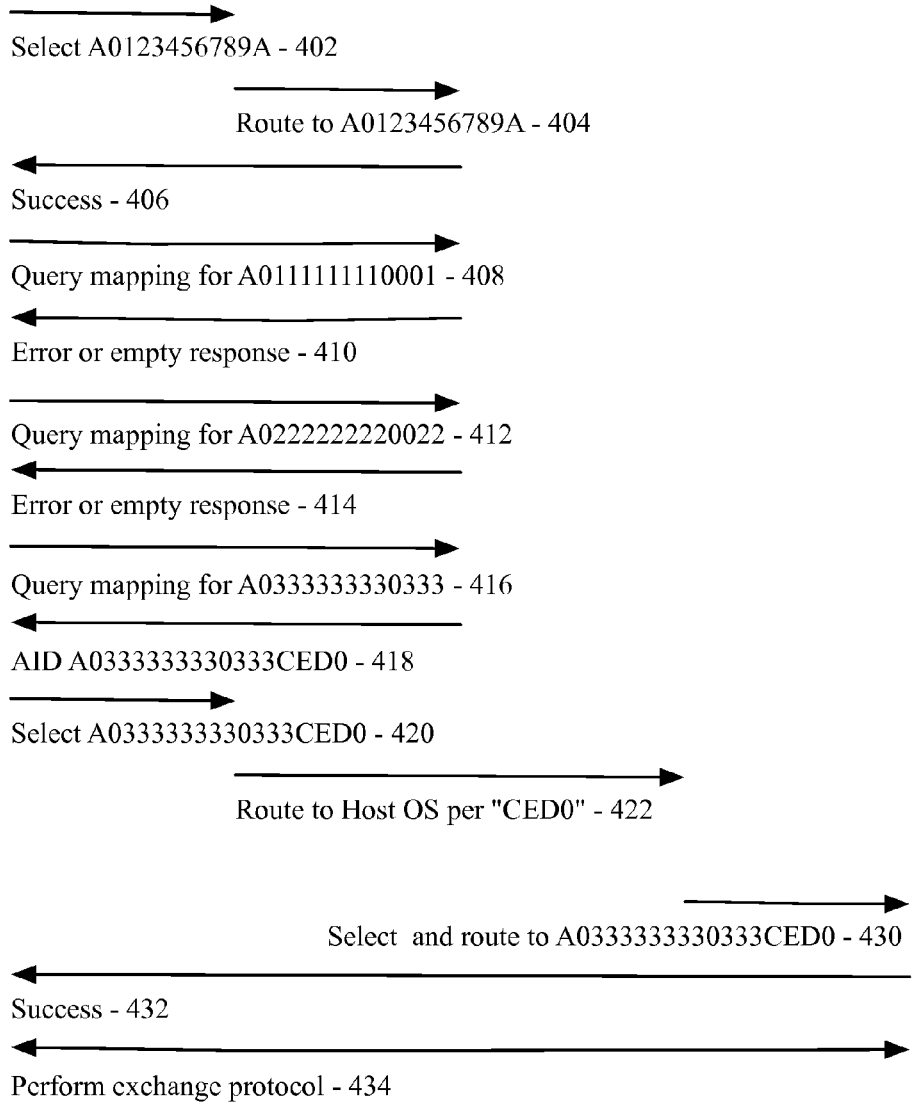
FIG. 4 is a message flow diagram depicting interaction between a host and a reader of FIG. 3, employing an AID proxy, in accordance with certain example embodiments.

Referring to FIG. 3, a block flow diagram depicting an interaction between a reader 112 and a host 120 employing an AID proxy 121a, in accordance with example embodiments of the present technology. Referring to FIG. 4, a message flow diagram 400 depicting interaction between a host 120 and a reader 112 of FIG. 5, employing an AID proxy 121a, in accordance with certain example embodiments is shown.

In such embodiments, a first selection of an NFC AID proxy of an NFC-enabled user computing device is received from an NFC reader by an NFC-enabled user computing device via an NFC channel—Block 310. Using the scenario described in the continuing example, the Bus reader 112 sends a message to the CLF 121 of the user's smartphone 120 selecting the AID proxy 121a—Message 402. The CLF 121 routes the message to the AID proxy 121a—Message 404. The AID proxy 121a replies to the reader 112, via the CLF 121 confirming the selection—Message 406.

The selected AID proxy receives, from the NFC reader via the NFC channel, a query directed to the availability of an NFC-enabled application on the NFC-enabled user computing device. The query includes an argument identifying the application by a domain name different than an AID of the application—Block 320. In the continuing example, the proxy 121a receives a query for the actual AID of an application corresponding to the Bus domain A0111111110001—Message 408.

The AID proxy determines whether the received domain name corresponds to an AID of an application available on the user computing device by reference to a data store relating each domain name of each application available on the user computing device to a corresponding AID—Block 330. In the continuing example, the proxy 121a responds to the reader 110, through the CLF 121 with an error message (Message 410) because the user's smartphone 120, which supports the BART HCE application, does not support any Bus applications.

In the continuing example, the proxy 121a and the Bus reader 110 iterate through Block 320 and Block 330 one more time, this time querying for the availability of a Cable Car application (Message 412) and receiving another error message (Message 414). The proxy 121a then queries for the actual AID of an application corresponding to the BART domain A0333333330333—Message 416.

For a received domain determined to correspond to an AID of an application available on the user computing device, the user computing device transmits a response to the received query to the reader via the channel. The response indicates the AID of the application corresponding to the received domain name—Block 340. In the continuing example, the proxy 121a determines that the BART domain A0333333330333 corresponds to the BART HCE application A0333333330333CED0 available on the smartphone 120, and responds to the reader 112, via the CLF 121, with the AID of the BART HCE application—Message 418.

The user computing device receives, from the reader device via the channel, a selection of the transmitted AID—Block 350. In the continuing example, the CLF 121 receives, from the reader 112 via NFC channel 130, a selection of the BART HCE application A0333333330333CED0—Message 420. The CLF 121 routes the selection to the host OS 127 based on routing information "CED0" embedded in the AID—Message 422. The host OS 127 routes the selection to the BART HCE application 128—Message 430. The BART HCE solution 128 acknowledges the selection—Message 432.

The application corresponding to selected AID communicates with the reader via the NFC channel in an NFC application protocol data unit (APDU) communication session—Block 360. In the continuing example, the BART HCE application 128 and the reader 112 communicate in an APDU session in accordance with the NFC protocol of the BART HCE application 128—Messages 434.

Figure 5:
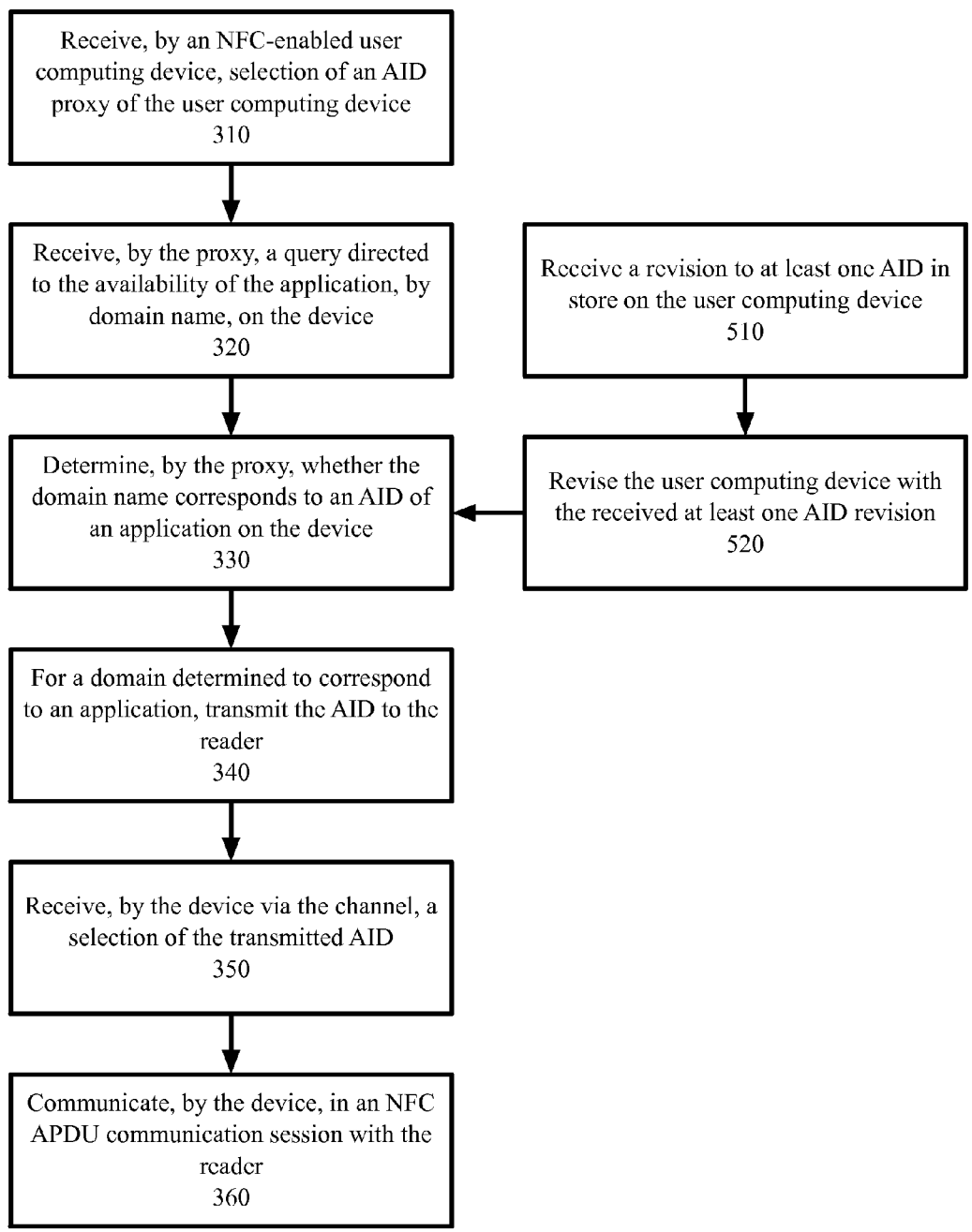
FIG. 5 is a block flow diagram depicting an interaction between a reader and a host employing an AID proxy, in accordance with example embodiments.
Figure 6:
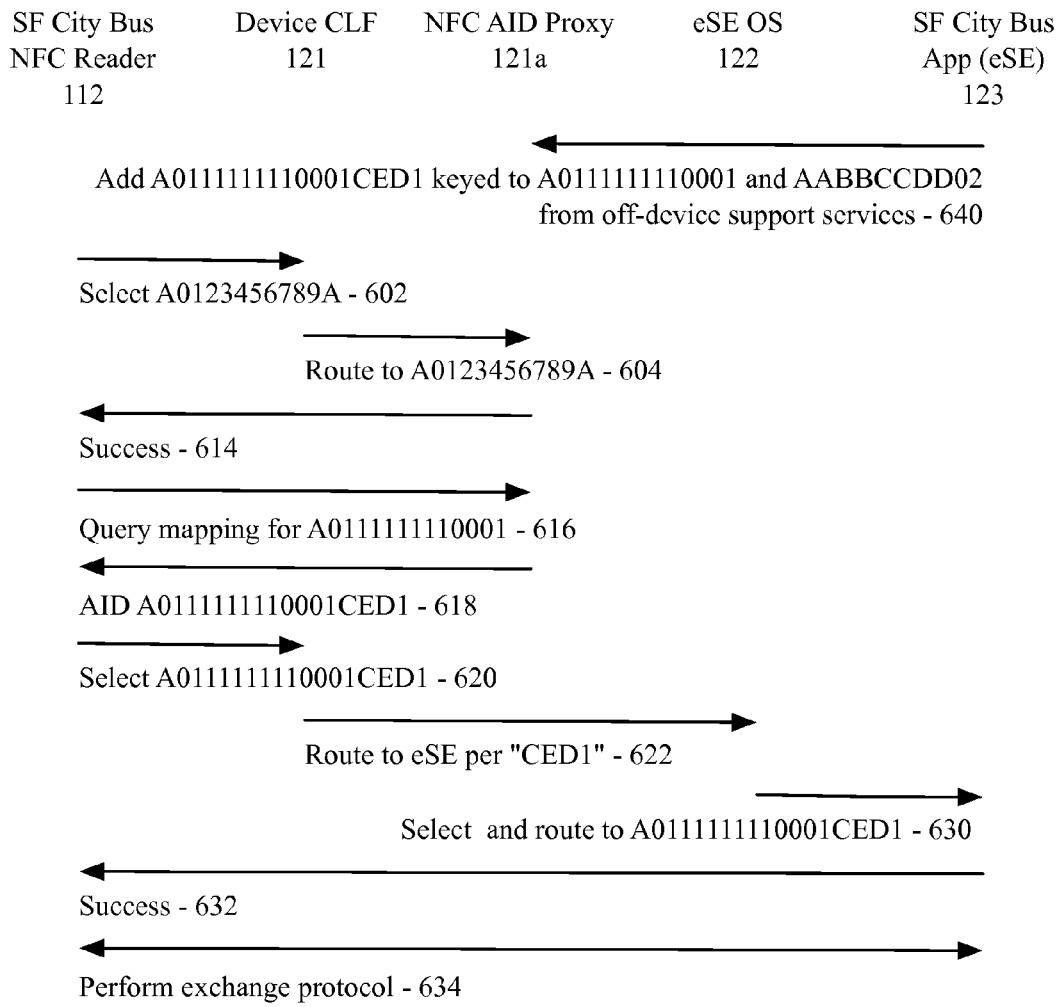
FIG. 6 is a message flow diagram depicting interaction between a host and a reader of FIG. 5, employing an AID proxy, in accordance with certain example embodiments.

Referring to FIG. 5, a block flow diagram 500 is shown depicting an interaction between a reader and a host employing an AID proxy, in accordance with example embodiments. Referring to FIG. 6, a message flow diagram depicting interaction between a host and a reader of FIG. 5, employing an AID proxy, in accordance with certain example embodiments is shown. In the continuing example, Bus extends its transit solution to the eSE environment by offering transit applet 123 executing on eSE 122 of the user's smartphone. The Bus eSE applet 123 domain is identified by pattern-based AID=A01111111100010ED1. This portion of the continuing example illustrates how updates to NFC solutions can be implemented with little or no change to the participating readers 112. The principle is applicable not only to the addition of NFC-enabled applets and applications, but also to new features and versions of existing applications while maintaining appropriate configuration management for the solution.

In such embodiments, Block 310-Block 360 can be performed as described in connection with FIG. 3. In such embodiments, the user computing device receives a revision to at least one AID in the data store relating each domain name of each application available on the user computing device to a corresponding AID—Block 510. The user computing device then revises the data store with the received at least one AID—Block 520. In this portion of the continuing example, the newly-installed Bus eSE applet 123 updates the proxy 121a to relate the applet's AID (A01111111100010ED1) to two (2) domain AIDs, the Bus domain AID (A0111111110001) and the Public domain AID (AABBCCDD02)—Message 640. The Bus reader 112 sends a message to the CLF 121 of the user's smartphone 120 selecting the proxy 121a-Message 602. The CLF 121 routes the message to the proxy 121a—Message 604. The proxy 121a replies to the reader 112, via the CLF 121, confirming the selection—Message 614. The proxy 121a receives a query from the reader 112 for the actual AID of an applet corresponding to the Bus domain A0111111110001—Message 616. Instead of responding with an error message (which would have been the case had the data store of the proxy 121a not been updated by Message 640 with the new Bus eSE applet AID), the proxy 121a responds to Message 616 with the actual AID of the Bus eSE applet 123 (A01111111100010ED1)—Message 618.

The CLF 121 receives, from the reader 112 via NFC channel 130, a selection of the Bus eSE applet A0333333330333CED01—Message 620. The CLF 121 routes the selection to the eSE OS 122 based on routing information "CED1" embedded in the AID—Message 622. The eSE OS 127 routes the selection to the Bus eSE applet 123—Message 630. The Bus eSE applet 123 acknowledges the selection—Message 632. The Bus eSE applet 123 and the reader 112 communicate in an APDU session in accordance with the NFC protocol of the Bus eSE applet 123—Messages 634.

Note that because the newly installed Bus eSE applet 123 also updated the proxy 121a to relate the applet's AID (A01111111100010ED1) to the Public domain AID (AABBCCDD02), a query on the Public domain AID will result in the same actual AID (A0333333330333CED1) being returned.

Figure 7:
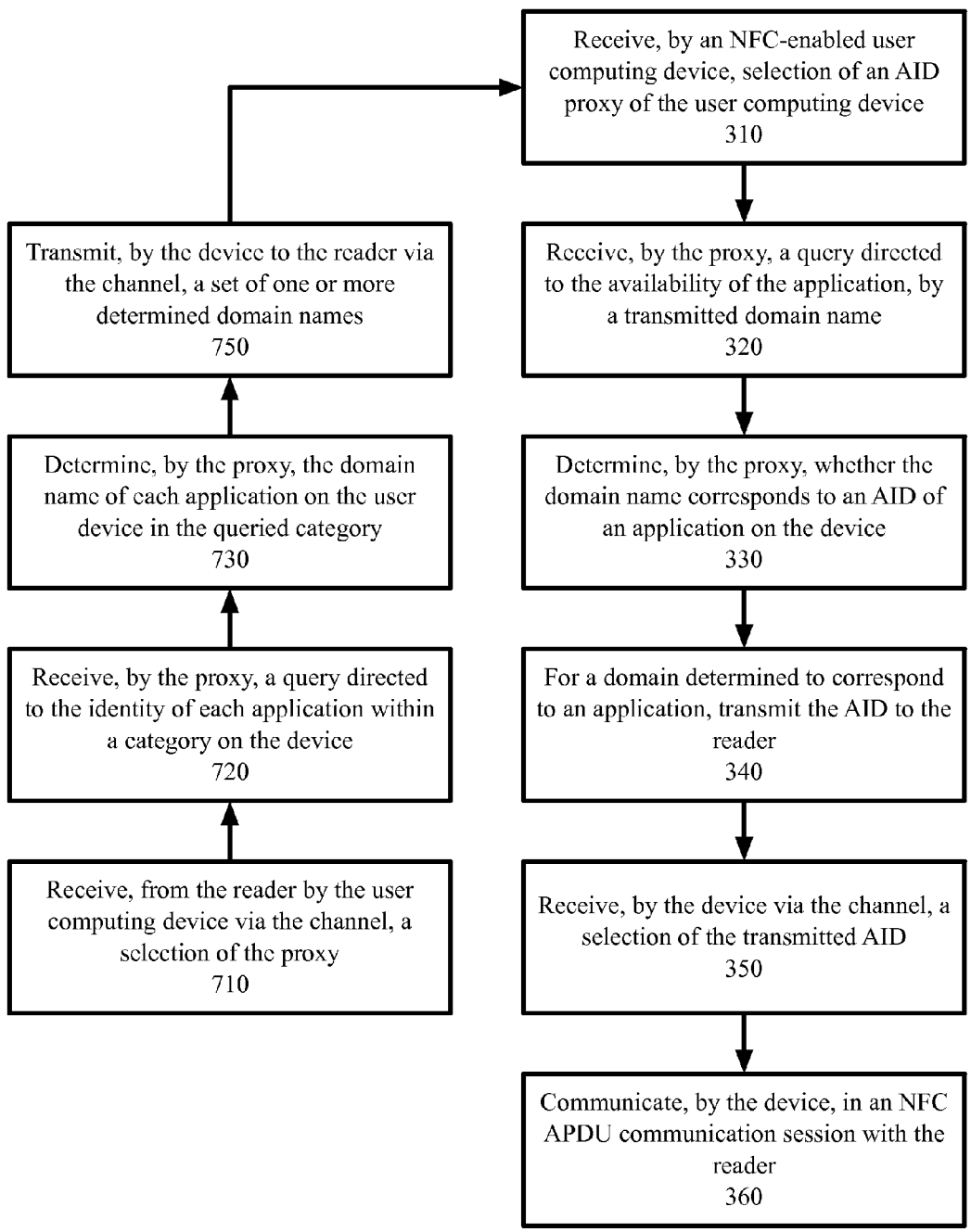
FIG. 7 is a block flow diagram depicting an interaction between a reader and a host employing an AID proxy, in accordance with example embodiments of the present technology.
Figure 8:
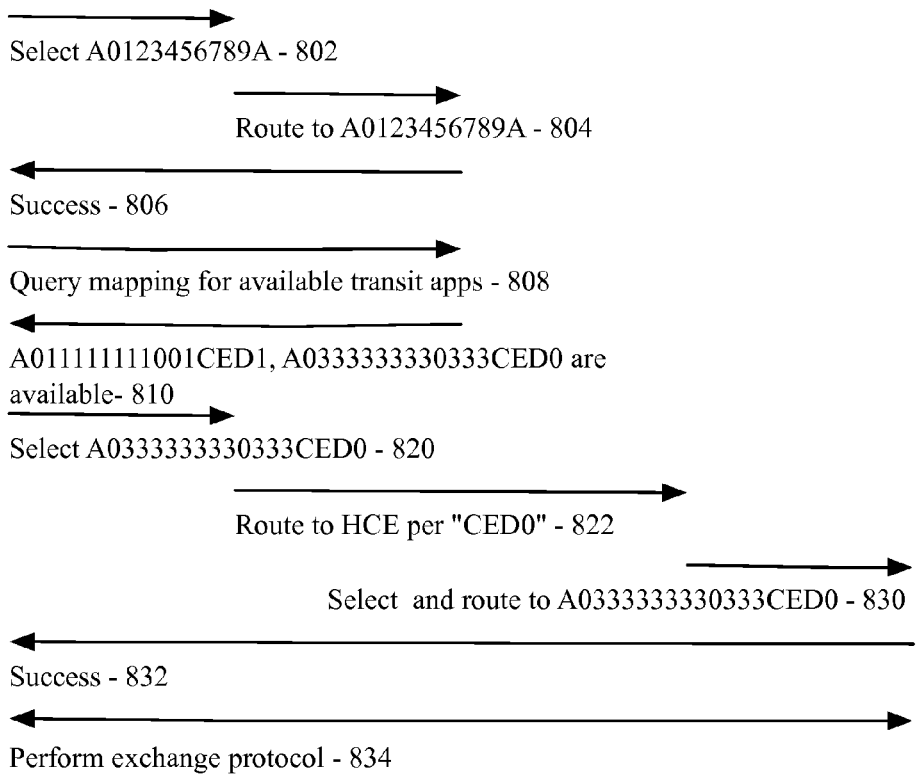
FIG. 8 is a message flow diagram depicting interaction between a host and a reader of FIG. 7, employing an AID proxy, in accordance with certain example embodiments.

Referring to FIG. 7, a block flow diagram 700 is shown depicting an interaction between a reader and a host employing an AID proxy, in accordance with example embodiments. Referring to FIG. 8, a message flow diagram 800 depicting interaction between a host and a reader of FIG. 5, employing an AID proxy, in accordance with certain example embodiments is shown. In such embodiments, before receiving the first selection of the proxy described in conjunction with FIG. 3, the user computing device receives from the reader, via the NFC channel, a prior selection of the proxy—Block 710. In the continuing example, the Bus reader 112 sends a message to the CLF 121 of the user's smartphone 120 selecting the AID proxy 121a—Message 802. The CLF 121 routes the message to the AID proxy 121a—Message 804. The AID proxy 121a replies to the reader 112, via the CLF 121 confirming the selection—Message 806.

The selected proxy receives, via the NFC channel from the reader, a query directed to the identity of each application within a category of applications on the user computing device, the query comprising an argument identifying the queried category of applications—Block 720. In the continuing example, the Bus reader 112 queries the NFC AID proxy 121a for a list of transit (category) domains available on the user's smartphone 120—Message 808. While in the continuing example, the query sent by the Bus reader 112 is directed to NFC-enabled transit applications, in other embodiments, other categories can be used, for example, local transit applications, payment applications, merchant loyalty card applications, event ticket applications, one-time use applications, and applications having domain AIDs fitting a specific criteria.

The selected proxy determines the domain name of each application on the user computing device responsive to the category—Block 730. In the continuing example, the proxy 121a determines that two AID domain names (A011111111001, A0333333330333) are available on the user's smartphone 120.

The user computing device transmits, via the channel, a set of one or more determined domain names responsive to the category—Block 750. In the continuing example, the proxy 121a transmits the two AID domain names (A011111111001, A0333333330333) as available on the user's smartphone 120—Message 810.

The CLF 121 receives, from the reader 112 via NFC channel 130, a selection of the BART HCE application A0333333330333CED0—Message 820. The CLF 121 routes the selection to the host OS 127 based on routing information "CED0" embedded in the AID—Message 822. The host OS 127 routes the selection to the BART HCE application 128—Message 830. The BART HCE application 128 acknowledges the selection—Message 832. The BART HCE application 128 and the reader 112 communicate in an APDU session in accordance with the NFC protocol of the BART HCE application 128—Messages 834.

While Block 310-Block 360 can be performed as described above in connection with FIG. 3, the query directed to the availability of an NFC-enabled application on the user computing device described in connection with Block 320 includes an argument identifying a domain name from among the transmitted set of one or more domain names in Block 750.

Figure 9:
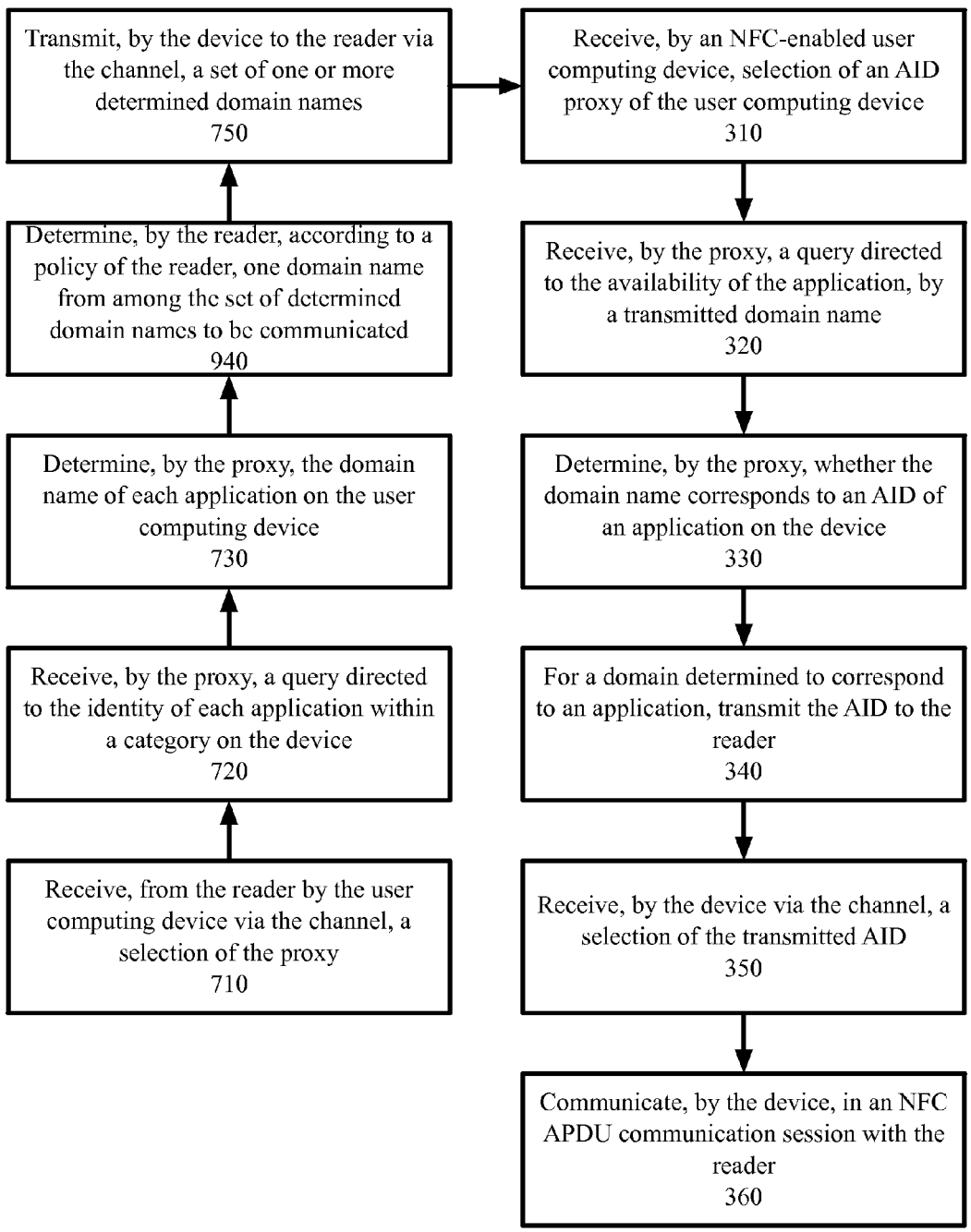
FIG. 9 is a block flow diagram depicting an interaction between a reader and a host employing an AID proxy, in accordance with example embodiments.

Referring to FIG. 9, a block flow diagram 900 is shown depicting an interaction between a reader and a host employing an AID proxy, in accordance with example embodiments. In such embodiments, Block 310-Block 360 and Block 710-Block 750 can be performed as described elsewhere herein. In such embodiments, after the user computing device transmits each domain name of applications in the queried category to the reader, and prior to the user computing device receiving the selection of an available domain name from the reader, the reader can determine, according to a policy of the reader, one domain name from among the set of domain names transmitted to the reader by the user computing device—Block 940. In the continuing example, the Bus reader 112 applies the policy mentioned earlier—both the Bus solution and the Cable Car solution accept any Public payment if the transit agency's own payment option is not present. In the continuing example, the user's smartphone 120 contains both the BART HCE application 128 and the Bus eSE applet 123, so the Bus reader 112 chooses the Bus eSE applet 123, since it is a Bus solution present.

The AID format used in the continuing example is an example of a patterned AID including routing information. In such a patterned AID (a "reserved pattern" AID), a two-byte pattern "CEDX," standing for "Card Emulation Destination X," the first three quartets of the pattern are presented as a non-numerical value that is not typically found in an AID. The last quartet (4 bits) allows for sixteen (16) possible destination identifiers. In some embodiments, under reserved pattern approach, an AID not containing the first two-byte reserved pattern would be routed by the CLF to a default route.

Consider, as another example of pattern-based AID routing, the use of the last byte of the AID. In this approach, the last byte of the AID can be reserved for specific instance of an application. Thus, the most significant bits of the last byte can be used for route identification purposes. For example, where there is HCE, one eSE, and one UICC on the host, two bits can be used to define those routes. For example, consider the chosen bits being bit 8 and 7, and value 00 representing HCE, 01 representing the eSE, 10 representing UICC, and 11 reserved for further use. The default route, in one example, could be the HCE route. Under this specific pattern, the following behavior is observed. A000001122010101 would be routed to HCE, as bit 8/7 is 00; A000001122010171 would be routed to eSE, as bit 8/7 is 01; A0000011220101A1 would be routed to UICC, as bit 8/7 is 10; and A0000011220101C1 would be routed to HCE, as bit 8/7 is 11 which is not defined.

Consider, as a further example of pattern-based AID routing, using a portion of a full length AID for routing. In this approach, the pattern is reserved using a 16-byte AID while using the last byte as the informational byte. In such an approach, bits 8 to 5 of the last byte represent of the length of intended AID, and bits 4 to 1 represent the route. For example, bits 4 to 1 with a value of 0 represents HCE, with a value of 1 represents eSE, and with a value of 2-9 represents UICC 1 to UICC 8. Values A to F are reserved for future use, and the default route is UICC 1. Under this specific pattern definition/technique, the following behavior is observed. A00000556603010000000000000070 would be an actual AID of A0000055660301 (instance ID=01) routed to HCE; A000005566030405110000000000092 would be an actual AID of A000005566603040511 (instance ID=11) routed to UICC 1; A00000556603040506070809020000D1 would be an actual AID of A0000055660304050607080902 (instance ID=02) routed to eSE; and each of A00000055660302 and A00000556603040506070809003 would be routed to the default UICC 1, as they do not have the pattern criteria specified in this technique.

Pattern-Based NFC AID routing also functions with end-to-end solutions, such as if the desired AID routing destination is pre-determined or can be prioritized implicitly ahead of time. Consider the following scenario. Hotel A partner with mobile Carrier B, to develop a hotel key access end-to-end solution utilizing a routing-embedded NFC AID approach. Being a mobile carrier solution, UICC would be the preferable choice for the secure environment. The AID being defined is A00000556619CED2 utilizing the pattern of the continuing example.

The Hotel key access reader (for example, one installed on room door), would always select A00000556619CED2 to initialize the communication. This approach would work using a user computing device that only supports NFC on UICC as NFC traffic would be routed to UICC. On a device that supports NFC with UICC and HCE (e.g. Android), combined with foreground take priority dynamic registration, this approach would work as NFC traffic would be routed to UICC. On a device that support NFC with UICC, HCE, as well as embedded SE under but does not implement this approach to pattern-based AID routing, the approach would not work as NFC traffic would not know which non-HCE environment (eSE vs. UICC) to route to.

Now, consider that Hotel chain A is still partnered with mobile Carrier B, but is allowed to provide alternative approach (e.g. HCE) as long as it is still prioritizing UICC solution, in case on device that is not capable to support NFC UICC or on other non-mobile Carrier B devices. Consider the AID being defined for the alternative solution is A00000556619CED0. For the hotel key access reader, when working with a device implemented this invention, if A00000556619CED2 is selected first, it would not work and result in error as the NFC UICC is not present and A00000556619CED2 is not found in UICC. The technology would then select A00000556619CED0, its alternative but lower priority solution. This selection would work as NFC traffic would be routed to HCE according to the pattern.

Other Example Embodiments

FIG. 10 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area WAN, local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. For example, while example embodiments disclosed herein include an SE in an UICC, an eSE, and HCE, the present technology can be implemented in devices no including one or more of these technologies, and can be implemented in devices including other secure technologies such as an SE in a microSD card hosted by a device such as a smartphone.

We claim:

1. A computer-implemented method to communicate via near field communication (NFC) between an NFC reader and an NFC-enabled application available on an NFC-enabled user computing device, comprising:

receiving, from an NFC reader by an NFC-enabled user computing device via an NFC channel, a first selection of an NFC application identifier (AID) proxy of the user computing device, the first selection addressed to an AID identifying the proxy;

receiving, from the NFC reader by the selected proxy via the channel, a query directed to an availability of an NFC-enabled application on the user computing device, the query comprising an argument identifying the application by a domain name different than an AID of the application;

determining, by the proxy, whether the received domain name corresponds to an AID of an application available on the user computing device by reference to a data store relating each domain name of each application available on the user computing device to a corresponding AID;

when the received domain name is determined to correspond to an AID of an application available on the user computing device, transmitting, to the NFC reader by the user computing device via the channel, a response to the received query, the response indicating the AID of the application corresponding to the received domain name;

receiving, from the NFC reader by the user computing device via the channel, a selection of the transmitted AID; and in response to the received selection of the transmitted AID, communicating, by the application corresponding to the selected AID via the channel, via an NFC application protocol data unit (APDU) communication session with the NFC reader.

2. The method of claim 1, further comprising:
receiving, by the user computing device, a revision to at least one AID in the data store relating each domain name of each application available on the user computing device to a corresponding AID; and
revising, by the user computing device, the data store with the received at least one AID.

3. The method of claim 1, further comprising:
prior to receiving the first selection of the proxy:
receiving, from the reader by the user computing device via the channel, a prior selection of the proxy;
receiving, from the reader by the prior selected proxy via the channel, at least one query directed to the identity of each application within a category of applications on the user computing device, the query comprising an argument identifying the queried category of applications;
determining, by the proxy, the domain name of each application on the user computing device in the queried category; and
transmitting, by the user computing device to the reader via the channel, a set of one or more determined domain names;
wherein the at least one query directed to the availability of an NFC-enabled application on the user computing device comprises an argument identifying a domain name from among the transmitted set of one or more domain names.

4. The method of claim 3, wherein the category of applications is one of payments, transit, access, and identification.

5. The method of claim 3, wherein the method further comprises, after transmitting each determined domain name by the user computing device to the reader, and prior to receiving the selection of an available domain name by the user computing device from the reader, determining, by the reader, according to a policy of the reader, one domain name from among the set of one or more determined domain names to be communicated.

6. The method of claim 1:
wherein the AID comprises embedded routing information; and
wherein communicating comprises routing, by the user computing device, each APDU received by the user computing device in accordance with the embedded routing information contained in the AID of each APDU.

7. The method of claim 6, wherein the embedded AID routing information comprises one of: a bit pattern in the last byte of the AID, and a 16-byte AID comprising an last bit quartet indicating AID routing information and a next-to-last bit quartet indicating the length of a base AID.

8. A computer program product, comprising:
a non-transitory computer-readable storage device having computer-executable
program instructions embodied thereon that when executed by a computer cause the computer to communicate via near field communication (NFC) between an NFC reader and an NFC-enabled application available on a NFC-enabled user computing device, the computer-executable program instructions comprising:
computer-executable program instructions to receive, from an NFC reader by an NFC-enabled user computing device via an NFC channel, a first selection command for an NFC application identifier (AID) proxy of the user computing device, the first selection addressed to an AID identifying the proxy;
computer-executable program instructions to receive, from the reader by the selected proxy via the channel, a query directed to an availability of an NFC-enabled application on the user computing device, the query comprising an argument identifying the application by a domain name different than an AID of the application;
computer-executable program instructions to determine, by the proxy, whether the received domain name corresponds to an AID of an application available on the user computing device by reference to a data store relating each domain name of each application available on the user computing device to a corresponding AID;
computer-executable program instructions, when the received domain name is determined to correspond to an AID of an application available on the user computing device, to transmit, to the NFC reader by the user computing device via the channel, a response to the received query, the response indicating the AID of the application corresponding to the received domain name;
computer-executable program instructions to receive, from the reader by the user computing device via the channel, a selection command for the transmitted AID; and
computer-executable program instructions to communicate, by the application corresponding to the selected AID via the channel, in an NFC application protocol data unit (APDU) communication session with the reader.

9. The computer program product of claim 8, further comprising:
receiving, by the user computing device, a revision to at least one AID in the data store relating each domain name of each application available on the user computing device to a corresponding AID; and revising, by the user computing device, the data store with the received at least one AID.

10. The computer program product of claim 8, further comprising:

prior to receiving the first selection of the proxy:

receiving, from the reader by the user computing device via the channel, a prior selection of the proxy;

receiving, from the reader by the prior selected proxy via the channel, at least one query directed to the identity of each application within a category of applications on the user computing device, the query comprising an argument identifying the queried category of applications;

determining, by the proxy, the domain name of each application on the user computing device in the queried category; and communicating, by the user computing device to the reader via the channel, a set of one or more determined domain names;

wherein the at least one query directed to the availability of an NFC-enabled application on the user computing device comprises an argument identifying a domain name from among the communicated set of one or more domain names.

11. The computer program product of claim 10, wherein the category of applications is one of payments, transit, access, and identification.

12. The computer program product of claim 10, wherein the method further comprises, after communicating each determined domain name by the user computing device to the reader, and prior to receiving the selection of an available domain name by the user computing device from the reader, determining, by the reader, according to a policy of the reader, one domain name from among the set of one or more determined domain names to be communicated.

13. The computer program product of claim 8:

wherein the AID comprises embedded routing information; and wherein communicating comprises routing, by the user computing device, each APDU received by the user computing device in accordance with the embedded routing information contained in the AID of each APDU.

14. The computer program product of claim 13, wherein the embedded AID routing information comprises one of: a bit pattern in the last byte of the AID, and a 16-byte AID comprising an last bit quartet indicating AID routing information and a next-to-last bit quartet indicating the length of a base AID.

15. A system to communicate via near field communication (NFC) between an NFC reader and an NFC-enabled application available on a NFC-enabled user computing device, comprising:

a storage device; and a processor communicatively coupled to the storage device, wherein the processor executes application code instructions that are stored in the storage device to cause the system to:

receive, from an NFC reader by an NFC-enabled user computing device via an NFC channel, a first selection of an NFC application identifier (AID) proxy of the user computing device, the first selection addressed to an AID identifying the proxy;

receive, from the reader by the selected proxy via the channel, a query directed to the availability of an NFC-enabled application on the user computing device, the query comprising an argument identifying the application by a domain name different than an AID of the application computer-executable program instructions to determine, by the proxy, whether the received domain name corresponds to an AID of an application available on the user computing device by reference to a data store relating each domain name of each application available on the user computing device to a corresponding AID;

computer-executable program instructions, when the received domain name is determined to correspond to an AID of an application available on the user computing device, to transmit, to the NFC reader by the user computing device via the channel, a response to the received query, the response indicating the AID of the application corresponding to the received domain name;

computer-executable program instructions to receive, from the reader by the user computing device via the channel, a selection of the transmitted AID; and computer-executable program instructions to communicate, by the application corresponding to the selected AID via the channel, in an NFC application protocol data unit (APDU) communication session with the reader in response to the received selection of the transmitted AID.

16. The system of claim 15, wherein the processor further executes application code instructions that are stored in the storage device to cause the system to:

receive, by the user computing device, a revision to at least one AID in the data store relating each domain name of each application available on the user computing device to a corresponding AID; and revise, by the user computing device, the data store with the received at least one AID.

17. The system of claim 15:

wherein the processor further executes application code instructions that are stored in the storage device to cause the system to, prior to receiving the first selection of the proxy:

receive, from the reader by the user computing device via the channel, a prior selection of the proxy;

receive, from the reader by the prior selected proxy via the channel, at least one query directed to the identity of each application within a category of applications on the user computing device, the query comprising an argument identifying the queried category of applications;

determine, by the proxy, the domain name of each application on the user computing device in the queried category; and communicate, by the user computing device to the reader via the channel, a set of one or more determined domain names;

wherein the at least one query directed to the availability of an NFC-enabled application on the user computing device comprises an argument identifying a domain name from among the communicated set of one or more domain names.

18. The system of claim 17, wherein the category of applications is one of payments, transit, access, and identification.

19. The system of claim 17, wherein the processor further executes application code instructions that are stored in the storage device to cause the system to, after communicating each determined domain name by the user computing device to the reader, and prior to receiving the selection of an available domain name by the user computing device from the reader, determine, by the reader, according to a policy of the reader, one domain name from among the set of one or more determined domain names to be communicated.

20. The system of claim 15:
wherein the AID comprises embedded routing information; and
wherein communicating comprises routing, by the user computing device, each APDU received by the user computing device in accordance with the embedded routing information contained in the AID of each APDU.

* * * * *